United States Patent
Luhrs et al.

(10) Patent No.: US 8,303,926 B1
(45) Date of Patent: Nov. 6, 2012

(54) SYNTHETIC METHODS FOR GENERATING $WS_2$ NANOSTRUCTURED MATERIALS

(75) Inventors: Claudia C. Luhrs, Rio Rancho, NM (US); Marwan Al-Haik, Albuquerque, NM (US); Hugo Zea, Bogotá (CO)

(73) Assignee: STC.UNM, Albuquerque, NM (US)

( * ) Notice: Subject to any disclaimer, the term of this patent is extended or adjusted under 35 U.S.C. 154(b) by 496 days.

(21) Appl. No.: 12/692,517

(22) Filed: Jan. 22, 2010

Related U.S. Application Data (60) Provisional application No. 61/146,387, filed on Jan. 22, 2009.

(51) Int. Cl.
C01B 17/20 (2006.01)
C04B 35/547 (2006.01)
C09D 1/00 (2006.01)
C10M 125/22 (2006.01)
H01M 4/58 (2010.01)

(52) U.S. Cl. .............. 423/561.1; 508/167; 204/164; 977/700; 977/734; 977/762; 977/773; 977/775

(58) Field of Classification Search ........... 423/561.1; 508/167; 204/164; 977/700, 734, 762, 773, 977/775
See application file for complete search history.

(56) References Cited

U.S. PATENT DOCUMENTS

| | | | |
|---|---|---|---|
| 2004/0038832 A1* | 2/2004 | Gingerich | 508/167 |
| 2010/0034728 A1* | 2/2010 | Seo et al. | 423/561.1 |
| 2012/0121973 A1* | 5/2012 | Seo et al. | 429/199 |

* cited by examiner

*Primary Examiner* — Timothy Vanoy
(74) *Attorney, Agent, or Firm* — MH2 Technology Law Group, LLP (57) ABSTRACT

In accordance with various embodiments, there are nanostructured materials including $WS_2$ nanostructures and composites of $WS_2$ nanostructures and other materials and methods for synthesizing nanostructured materials. The method can include providing a plurality of precursor materials, wherein each of the plurality of precursor materials can include a tungsten reactant. The method can also include flowing, for a reaction time, a substantially continuous stream of carbon disulfide ($CS_2$) vapor in a carrier gas over the plurality of precursor materials at a temperature in the range of about 700° C. to about 1000 C, wherein the reaction time is sufficient to permit the tungsten reactant to react with carbon disulfide to form a plurality of tungsten disulfide ($WS_2$) nanostructures.

22 Claims, 5 Drawing Sheets

SYNTHETIC METHODS FOR GENERATING WS₂ NANOSTRUCTURED MATERIALS

RELATED APPLICATIONS

This application claims priority from U.S. Provisional Patent Application Ser. No. 61/146,387, filed Jan. 22, 2009, which is hereby incorporated by reference in its entirety.

FIELD OF THE INVENTION

This invention relates generally to nanostructured materials and, more particularly, to the methods of making. WS$_2$ nanostructured materials.

BACKGROUND OF THE INVENTION

Inorganic nanostructures of tungsten sulfide (WS$_2$) have many desirable properties and numerous applications. For example, Zhu et al. reported in *JACS*, 2003, 125, 1329-1333, that WS$_2$ nanotubes have been proven to be one of the most shock resistant substances known to be able to withstand shear stress caused by shock waves of up to 21 GPa. In addition, tungsten sulfides have been widely used as dry lubricants and low friction coatings, which extend the lifetime of machine bearings by a factor of 10-100, as reported by Therese et al. in *Solid State Science*, 2005, 67-72. Other potential applications of WS$_2$ nanostructures widely reported in literature include the use of WS$_2$ nanostructures as hydrogen storage devices (Chen et al. in *Appl. Phys. A* 78 989-994, 2004), lithium storage for battery use (Wang. et al. in *Electrochemical and Solid-state Letters*, 7 (10) A321-A323, 2004), lithium storage for battery use, and catalysis.

Conventional methods for making WS$_2$ nanostructures employ chemical or reducing atmospheres to react with WO$_3$. However H$_2$S, the common sulfur precursor for the synthesis of WS$_2$ from WO$_3$ is toxic, corrosive, and highly flammable. Hence, there is a need for less harmful methods for the formation of WS$_2$.

Thus, there is a need to overcome these and other problems of the prior art and to provide alternative synthetic methodologies for generation of WS$_2$ nanostructured materials.

SUMMARY OF THE INVENTION

In accordance with various embodiments, there is a method for synthesizing a nanostructured material. The method can include providing a plurality of precursor materials, wherein each of the plurality of precursor materials can include a tungsten reactant. The method can also include flowing, for a reaction time, a substantially continuous stream of carbon disulfide (CS$_2$) vapor in a carrier gas over the plurality of precursor materials at a temperature in the range of about 700° C. to about 1000 C, wherein the reaction time is sufficient to permit the tungsten reactant to react with carbon disulfide to form a plurality of tungsten disulfide (WS$_2$) nanostructures.

According to another embodiment, there is a method for synthesizing a nanostructured material. The method can include providing a plurality of precursor materials, wherein each of the plurality of precursor materials can include a tungsten reactant. The method can also include flowing, in a plasma system, a substantially continuous stream of carbon disulfide (CS$_2$) vapor in a carrier gas over the plurality of precursor materials for a reaction time, wherein the reaction time is sufficient to permit the tungsten reactant to react with carbon disulfide to form a plurality of tungsten disulfide (WS$_2$) nanostructures.

Additional objects and advantages of the invention will be set forth in part in the description which follows, and in part will be obvious from the description, or may be learned by practice of the invention. The objects and advantages of the invention will be realized and attained by means of the elements and combinations particularly pointed out in the appended claims.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this specification, illustrate several embodiments of the invention and together with the description, serve to explain the principles of the invention.

DESCRIPTION OF THE EMBODIMENTS

Reference will now be made in detail to the exemplary embodiments of the invention, examples of which are illustrated in the accompanying drawings. Wherever possible, the same reference numbers will be used throughout the drawings to refer to the same or like parts. In the following description, reference is made to the accompanying drawings that form a part thereof, and in which is shown by way of illustration specific exemplary embodiments in which the invention may be practiced. These embodiments are described in sufficient detail to enable those skilled in the art to practice the invention and it is to be understood that other embodiments may be utilized and that changes may be made without departing from the scope of the invention. The following description is, therefore, merely exemplary.

Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard deviation found in their respective testing measurements. Moreover, all ranges disclosed herein are to be understood to encompass any and all sub-ranges subsumed therein. For example, a range of "less than 10" can include any and all sub-ranges between (and including) the minimum value of zero and the maximum value of 10, that is, any and all sub-ranges having a minimum value of equal to or greater than zero and a maximum value of equal to or less than 10, e.g., 1 to 5. In certain cases, the numerical values as stated for the parameter can take on negative values. In this case, the example value of range stated as "less that 10" can assume negative values, e.g. −1, −2, −3, −10, −20, −30, etc.

As used herein, the terms "nanostructured material" and "$WS_2$ nanostructured material" refer to $WS_2$ nanostructures in any form, such as, for example, flakes, particles, fibers, tubes, rods, spheres (inorganic fullerene), and octahedral crystals; and nanostructured composite materials including $WS_2$ nanostructures and one or more materials such as, for example, metals, ceramics, and/or polymers.

Exemplary embodiments provide methodologies for preparing $WS_2$ nanostructured materials in various nanostructural forms including, but not limited to, flakes, particles, fibers, tubes, rods, spheres (inorganic fullerene), and octahedral crystals. As used herein, the term "flake" is used interchangeably with the terms ""nanoflake", foil", and "thin foil"; "rod" is used interchangeably with the term ""nanorod"; "tube" is used interchangeably with the term " "nanotube"; "sphere" is used interchangeably with the term "nanosphere". Specifically, $WS_2$ nanostructured materials can be formed from a tungsten containing precursor, for example, from $WO_3$ particles, which can react with a sulfur (s) containing material other than hydrogen sulfide ($H_2S$), for example, carbon disulfide ($CS_2$), to form various $WS_2$ nanostructures. In some embodiments, the $WS_2$ nanostructures can be formed thermally using a furnace. In other embodiments, the $WS_2$ nanostructures can be formed using a plasma system.

Figure 1:
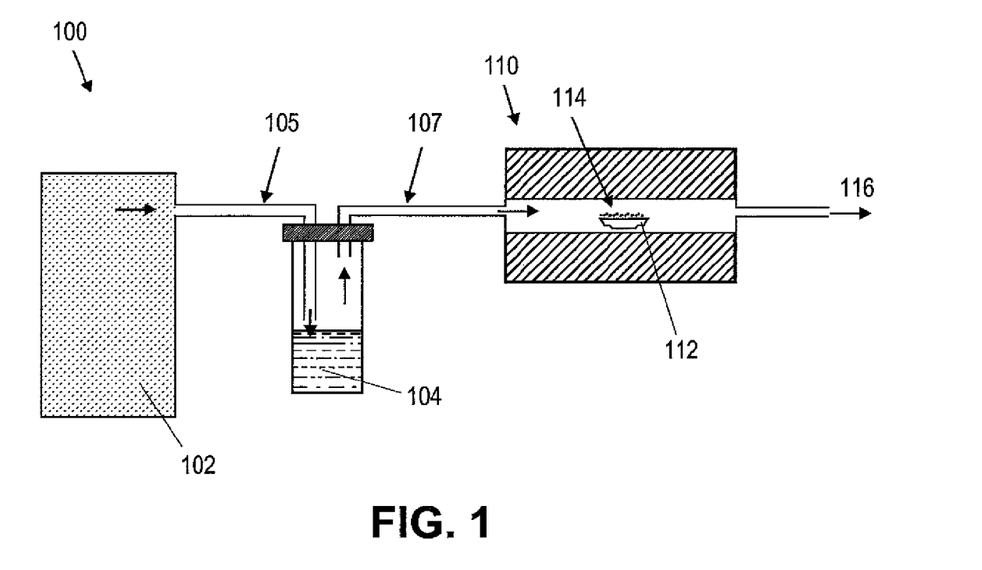
FIG. 1 shows a schematic illustration of an exemplary experimental set up to synthesize WS$_2$ nanostructures in accordance with the present teachings.

FIG. 1 shows a schematic illustration of an exemplary experimental set up 100 for the formation of $WS_2$ nanostructured materials in accordance with various embodiments. The experimental set up 100 can include a first reservoir 102 containing carrier gas and a second reservoir 104 containing carbon disulfide. In some embodiments, the carrier gas can include one or more inert gases including, but not limited to, nitrogen, argon, and the like. In other embodiments, the carrier gas can include a mixture of an inert gas and a reducing gas, such as, for example, argon and hydrogen; and nitrogen and hydrogen. In various embodiments, the first reservoir 102 containing the carrier gas can be connected to the second reservoir 104 via a first tubing 105. The second reservoir 104 can be connected to a reactor 110 via a second tubing 107 to provide a substantially continuous flow of carbon disulfide and the carrier gas to the reactor 110. In various embodiments, the experimental set up 100 can also include one or more flow meters or regulators to regulate the flow of the carrier gas into the second reservoir 104 and/or to regulate the flow of carbon disulfide and the carrier gas to the reactor 110. The reactor 110 can also include an exhaust outlet 116. In some embodiments, the reactor 110 can include a furnace or an oven. In other embodiments, the reactor 110 can include a plasma system. Any suitable plasma system can be used, including, but not limited to, microwave plasma torch system, RF and DC plasma systems operating at below atmospheric pressures.

In various embodiments, there is a method of forming a nanostructured material. The method can include providing a plurality of precursor materials 114 in a container 112. In various embodiments, each of the plurality of precursor materials 114 can include at least one tungsten reactant. Any suitable tungsten reactant can be used, including, but not limited to, tungsten oxides such as, for example, tungsten(VI) oxide ($WO_3$), tungsten(IV) oxide ($WO_2$), other tungsten oxides ($WO_{3-x}$), and the like and tungsten salts such as, for example, tungsten(IV) chloride and the like. In some embodiments, the step of providing the plurality of precursor materials 114 can include plurality of precursor materials 114 in the powder form. In other embodiments, the step of providing plurality of precursor materials 114 can include providing the plurality of precursor materials 114 as liquid dispersions or aerosols. The method can further include placing the plurality of precursor materials 114 including at least one tungsten reactant inside the reactor 110. Any suitable means can be used to place the plurality of particles inside the reactor. In some embodiments, the plurality of particles 114 can be placed in a crucible, such as, for example, ceramic crucible. In other embodiments, the plurality of particles 114 can be placed in a quartz tube. In various embodiments, the plurality of precursor materials 114 can be also fed into the reactor 110 as a solid mixed with the carrier gas and $CS_2$. In some other embodiments, the plurality of precursor materials 114 can be dispersed or dissolved in a solvent and can be fed into the reactor 110 as a liquid or aerosol through the line/second tubing 107.

In various embodiments, each of the plurality of precursor materials 114 in the powder form can have at least one dimension in the range of about 10 nm to about 20 μm. In some cases, the plurality of precursor materials 114 can be nanoparticles having a diameter in the range of about 20 nm to about 500 nm. In some other cases the plurality of precursor materials 114 can be micron sized having a diameter in the range of about 0.5 μm to about 20 μm.

The method of forming a nanostructured material can also include flowing a substantially continuous stream of carbon disulfide ($CS_2$) vapor 104 in the carrier gas 102 over the plurality of precursor materials 114 inside the reactor 110 for a reaction time. In certain embodiments, the carrier gas 102 can also include hydrogen or a mixture of hydrogen and nitrogen. In various embodiments, the temperature of the reactor such as, furnace, can be in the range of about 700° C. to about 1000° C. and in some cases in the range of about 750° C. to about 1000° C. The reaction time should be sufficiently long to permit the tungsten reactant to react with the carbon disulfide to form a plurality of tungsten disulfide ($WS_2$) nanostructures. In some embodiments, the reaction time can be at least about 20 minutes. In other embodiments, the reaction time can be in the range of about 1 hour to about 6 hours and in some other embodiments, the reaction time can be in the range of about 3 hours to about 36 hours. In certain embodiments, the step of flowing, for a reaction time, a substantially continuous stream of carbon disulfide ($CS_2$) vapor 104 in a carrier gas 102 over the plurality of precursor materials 114 can include flowing, for a reaction time, a substantially continuous stream of a mixture of carbon disulfide ($CS_2$) vapor, the carrier gas, and the plurality of precursor materials at a temperature in the range of about 700° C. to about 1000° C. in the reactor 110.

In various embodiments, the $WS_2$ nanostructures formed can be in a form of, for example, flakes, particles, fibers, tubes, rods, spheres (inorganic fullerene), and octahedral crystals depending on the specific synthetic conditions, such as reaction time, reaction temperature, dimensions of the reactor 110, and/or carrier and $CS_2$ gas flow rate in the reactor. By adjusting one or more of these parameters, such as reaction time, reaction temperature, dimensions of the reactor 110, and/or carrier and $CS_2$ gas flow rate in the reactor, one can adjust the production (yields) of one or more particular nanostructural forms of the $WS_2$ nanostructured materials. As discussed in detail in Example 5, nanoflakes were found to form more than nanospheres at lower temperatures and shorter reaction times. Nanotubes, on the other hand, were found to form at lower temperatures for longer reaction times or at higher temperatures under all reaction times.

Exemplary embodiments also provide another method to generate $WS_2$ nanostructures using a plasma system. The resulting $WS_2$ nanostructures can be in the nanostructural form of, for example, flakes, particles, fibers, tubes, rods, spheres (inorganic fullerene), and octahedral crystals. In an exemplary embodiment, inorganic fullerene like IF—$WS_2$ substantially spherical nanoparticles can be formed using a microwave plasma torch system. In various embodiments, the experimental set up 100, as shown in FIG. 1 can also be used for generating $WS_2$ nanostructures using a plasma system, with the reactor 110 being a plasma reactor. Any suitable plasma reactor can be used, including, but not limited to, microwave plasma torch system, RF and DC plasma systems operating at below atmospheric pressures. In some embodiments, the plasma reactor 110 can be a microwave plasma torch system 110 operating at a low power, e.g., about 1 kW or less, and at a pressure close to atmospheric pressure (e.g., about 1 torr to about 70 torr higher or lower than the atmospheric pressure). Additional information about the plasma torch system can be found in Chen et al., Journal of Material Research, Vol. 14, No. 5, pages 1256-1265, entitled "Low Power Plasma Torch Method for the Production of Crystalline Spherical Ceramic Particles," which is hereby incorporated by reference in its entirety. The plasma torch system can further include inert gases 102 such as Ar, $N_2$ or their combinations, to be used as plasma and/or carrier gases. $CS_2$ vapor 104 can be introduced into the substantially continuous stream of plasma and carrier gas(es) and mixed with the plurality of precursor materials (e.g., $WO_3$) via an alumina tube to the hot zone of the plasma. The reaction products of the reaction in the plasma system 110 can be collected, for example, in a filter paper, through a quartz tube chimney after the reaction product passes the area where the plasma is confined. The WS2 nanostructured material so formed can be present in any nanostructural form, for example, flakes, particles, fibers, tubes, rods, spheres (inorganic fullerene), and octahedral crystals.

By using the above described methods, various $WS_2$ structures can therefore be formed in a nanometer scale from the exemplary precursor materials including tungsten reactant (e.g., $WO_3$) and $CS_2$ vapor. The use of $CS_2$ can allow the oxygen in the tungsten reactant to be substituted by S atoms to produce tungsten disulfide without the use of reducing atmospheres or hazardous and toxic chemicals, such as $H_2S$ (usually Ar/$H_2$ mixtures along with $H_2S$ are employed in the prior art). However, in some embodiments, reducing atmospheres can be used by employing a mixture of carrier gases including inert gases and hydrogen. In addition, reaction conditions for the formation of $WS_2$ nanostructures can be mild and readily fulfilled. For example, a relatively lower temperature (about 750° C.) can be utilized in the synthesis of inorganic fullerene like $WS_2$ (IF—$WS_2$) in accordance with present teachings, as compared to the temperatures used in the prior art of about 850° C. or even about 1000° C. Further, the disclosed technologies can be less expensive, and readily scalable since it can utilize a simple one-zone furnace tube and requires no special machining or equipment. Furthermore, more aggressive reaction conditions can be used to render $WS_2$ nanoproduct with more desirable structures. For example, when nanoparticles of $WS_2$ are generated in a microwave plasma torch system, a variety of nanostructural forms can be obtained including, but not limited, flakes, particles, fibers, tubes, rods, spheres (inorganic fullerene), and octahedral crystals.

In various embodiments, the methods of forming a nanostructured materials either thermally or using plasma system as described above can further include adding the plurality of tungsten disulfide ($WS_2$) nanostructures to one or more of metals, ceramics, and polymers to form a nanostructured composite material (or nanocomposite or nanostructured material). Any suitable metal such as aluminum can be used. Exemplary ceramics can include, but are not limited to, cement, alumina, silica, titania, and the like. Any suitable polymer can be used for forming composites including epoxies. In certain embodiments, there is a nanostructured composite material including a major amount of one or more materials selected from the group consisting of metals, ceramics, and polymers and a minor amount of a plurality of $WS_2$ nanostructures formed using the methods described above. The plurality of $WS_2$ nanostructures can be added in any suitable amount, such as, up to the percolation limit. In some embodiments, the plurality of $WS_2$ nanostructures present in the nanostructured composite material can be of one nanostructural form selected from the group consisting of flakes, particles, fibers, tubes, rods, spheres (inorganic fullerene), and octahedral crystals. In other embodiments, the plurality of $WS_2$ nanostructures present in the nanostructured composite material can include a mixture of nanostructural forms selected from the group consisting of flakes, particles, fibers, tubes, rods, spheres (inorganic fullerene), and octahedral crystals. In some embodiments, the amount of $WS_2$ nanostructures in the composite can be up to about 3 weight %.

Examples are set forth herein below and are illustrative of different amounts and types of reactants and reaction conditions that can be utilized in practicing the disclosure. It will be apparent, however, that the disclosure can be practiced with other amounts and types of reactants and reaction conditions than those used in the examples, and the resulting devices various different properties and uses in accordance with the disclosure above and as pointed out hereinafter.

EXAMPLES

Example 1

Formation of $WS_2$ Flakes with a Thickness in Nanometer Scale

Figure 2:
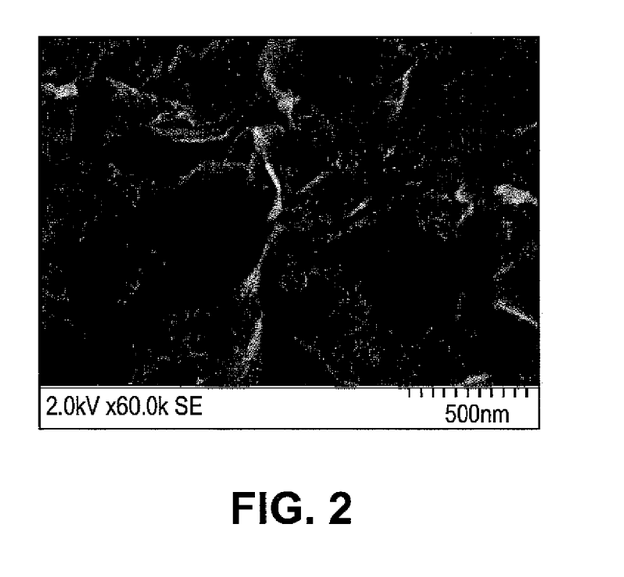
FIG. 2 depicts a schematic illustration of an SEM image of exemplary WS$_2$ flakes in accordance with the present teachings.

Synthesis was started by placing micron sized $WO_3$ particles (Sigma-Aldrich Corp., St. Louis, Mo.) in a ceramic boat inside a quartz tube into a tubular furnace Model 3210 (Applied Test Systems, Inc., Butler, Pa.). The system was then closed with stainless steel lids amid tubing connectors that directed argon stream into the quartz tube. The location of the precursor materials were coincided with the central heating zone of the furnace. A trap containing liquid $CS_2$ was then placed between the Ar source and the furnace. Hosing was connected in a manner such that the $CS_2$ vapor was carried with the Ar stream into the quartz tube, and Ar flow rate was adjusted to be about 6.27 slpm. The furnace was then heated to a temperature of about 750° C. with a constant supply of the argon and $CS_2$ mixture and the reaction of the $WO_3$ precursor nanoparticles with $CS_2$ vapor in the quartz tube was allowed to continue for about 2 hours. In this manner, $WS_2$ flakes were formed having a thickness of about 3 nm or less. FIG. 2 depicts a schematic illustration of an SEM image of the exemplary resulting flakes of $WS_2$.

Example 2

Formation of $WS_2$ Nanofibers

Figure 3:
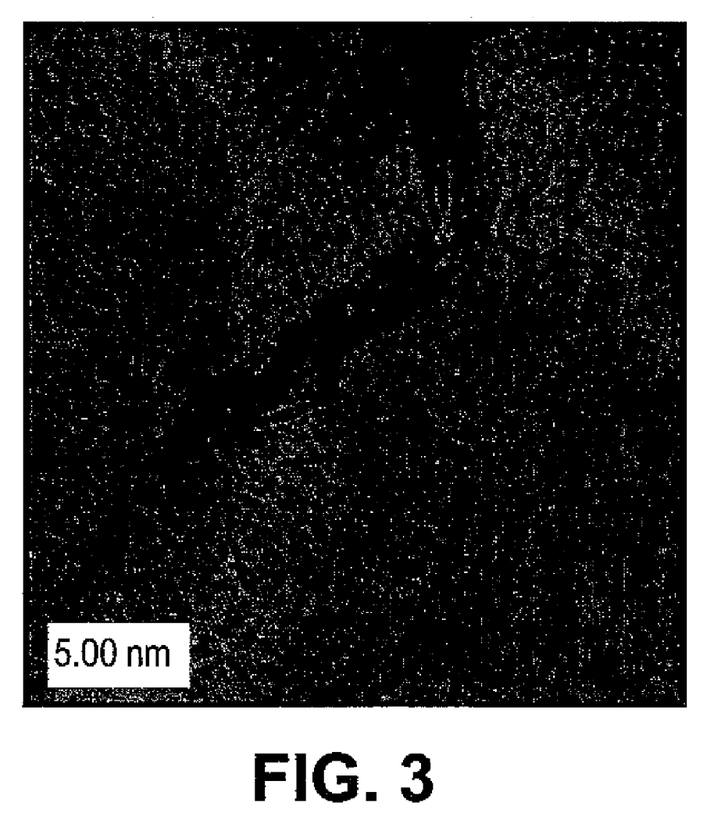
FIG. 3 depicts a TEM image of exemplary WS$_2$ nanofibers in accordance with the present teachings.

The procedure of Example 1 was repeated with the exception of reaction time. When the reaction time was increased to be about 5 hours, $WS_2$ nanofibers were formed from the reaction of the $WO_3$ precursor nanoparticles with $CS_2$ vapor. The resulting product included at least about 5% of $WS_2$ nanofibers as well as production of $WS_2$ flakes. FIG. 3 depicts an exemplary TEM image results of $WS_2$ nanofibers obtained when the reaction time was about 5 hours in accordance with the present teachings.

Example 3

Formation of $WS_2$ nanoparticles

Figure 4:
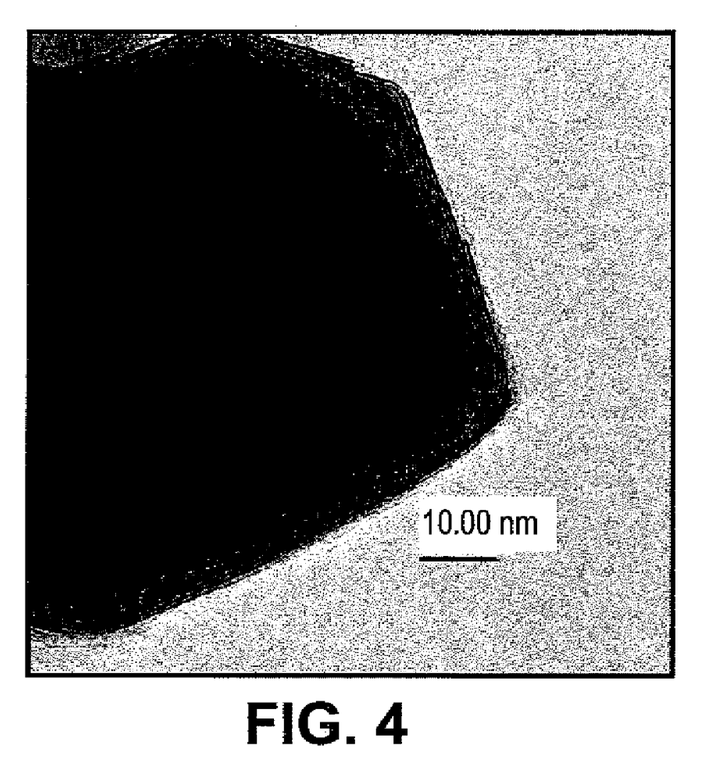
FIG. 4 depicts a TEM image of an exemplary WS$_2$ nanoparticle in accordance with the present teachings.

The procedure of Example 1 was repeated with the exception of reaction time. In this example, the reaction time was increased to about 24 hours for the reaction between $WO_3$ precursor nanoparticles and $CS_2$ vapor in the quartz tube. $WS_2$ nanoparticles were obtained after the 24-hour reaction. Also, at least about 20% of the nanoparticles possessed inorganic fullerene like structures. As an example, FIG. 4 depicts a TEM image of a $WS_2$ nanoparticle obtained when $WO_3$ was treated in an $Ar/CS_2$ atmosphere at about 750° C. for about 24 hours in accordance with the present teachings. In particular, the TEM image shows lattice fringes corresponding to $WS_2$ structure and an empty core characteristic of $WS_2$ semispherical nanostructures.

Example 4

Formation of Inorganic Fullerenes (IF)—$WS_2$ Nanostructures

Figure 5:
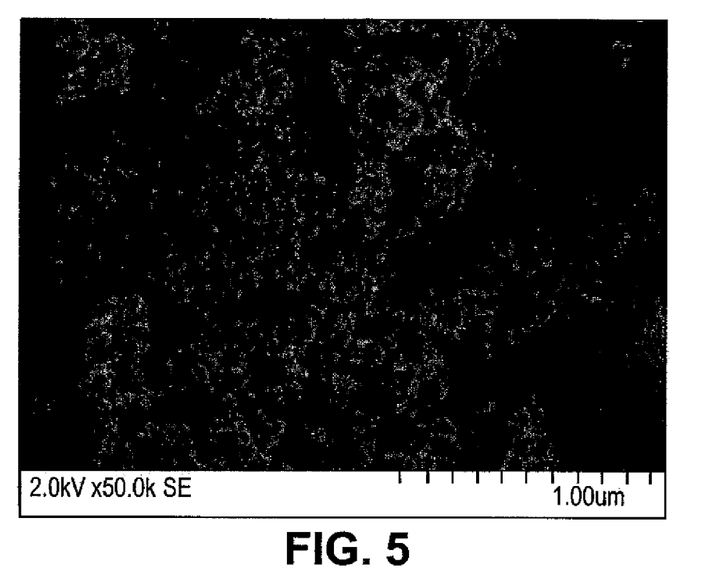
FIG. 5 depicts an SEM image of exemplary WS$_2$ nanostructures obtained using a plasma system in accordance with the present teachings.

The IF—$WS_2$ nanostructures were formed using a plasma system. A microwave was used to generate plasma that operated at about 900 Watts. Inert gas Ar was used to create a plasma discharge with a gas flow rate of about 2.5 slpm. Micrometer size $WO_3$ particles were used as precursor materials and placed in a beaker. A substantially continuous stream of argon carrying $CS_2$ vapors at a rate of about 0.186 slpm was introduced in the beaker and the mixture of particles and gas (may include dry aerosol) was conducted via an alumina tube to a hot zone of the plasma. The pressure in the system exhaust was about 10 torr above the atmospheric pressure. The produced $WS_2$ traveled through a quartz tube chimney after passing the area where the plasma was confined and the product was collected in a filter paper. As an example, FIG. 5 depicts a SEM image of the product obtained using the plasma torch method in accordance with the present teachings. As shown, various shapes and configurations of the $WS_2$ nanostructures were distinguished, for example, rods, spheres, and/or crystals with octahedral shapes.

Example 5

Study of $WS_2$ Nanostructure Morphology in Relation to Reaction Time and Temperature Synthesis was started by placing $WO_3$ particles in a ceramic boat inside a quartz tube into a tubular furnace Model 3210 (Applied Test Systems, Inc., Butler, Pa.). The system was then closed with stainless steel lids amid tubing connectors that directed $H_2/N_2$ (7%/93%) stream into the quartz tube. A trap containing liquid $CS_2$ was placed between the $H_2/N_2$ source and the furnace. The $H_2/N_2$ flow rate was adjusted to a consistent value. The housing was connected in a manner whereby the $CS_2$ vapor could get carried with the $H_2/N_2$ stream into the quartz tube. The furnace was heated to temperatures varying from about 700° C. to about 1,000° C. with a constant supply of the gas mixture for time periods varying from about 3 hours to about 12 hours and the temperature profile was risen in about 3 hour increments. Table 1 shows the summary of experimental results.

TABLE 1

|  | 3 hours | 6 hours | 9 hours | 12 hours |
| --- | --- | --- | --- | --- |
| 700° C. | Nanospheres Nanoflakes | Nanospheres Nanoflakes | Few Nanotubes Nanospheres Nanoflakes | Few Nanotubes Nanospheres Nanoflakes |
| 800° C. | Nanospheres Nanoflakes | Nanospheres Nanoflakes | Few Nanotubes Nanospheres Few Nanoflakes | Few Nanotubes Nanospheres Nanoflakes |
| 900° C. | Few Nanotubes Nanospheres Nanoflakes | Some Nanotubes Nanospheres Nanoflakes | Few Nanotubes Nanospheres Nanoflakes | Few Nanotubes Nanospheres Nanoflakes |
| 1000° C. | Some Nanotubes Nanospheres Nanoflakes | Few Nanotubes Nanospheres Nanoflakes | Few Nanotubes Nanospheres Nanoflakes | Few Nanotubes Nanospheres Nanoflakes |

As summarized in Table 1, the tungsten oxide nano-powder did not produce samples that contained 100% nanoflakes or nanospheres or nanotubes under this particular set of conditions. $WS_2$ nanoflakes and nanospheres were formed at all temperatures in the range of about 700° C. to about 1000° C. and for reaction time of about 3 hours to about 12 hours. Furthermore, it was found that the amount of $WS_2$ nanoflakes was larger than the amount of $WS_2$ nanospheres at lower temperatures and short reaction times. Also, high percentages of spherical particles were found in most cases, thereby implying that $WS_2$ nanospheres were the most stable nanostructures.

SEM analysis of the $WS_2$ nanostructures of Table 1 revealed that spherical and cylindrical crystals had a diameter in the range of about 10 nm to about 80 nm. The $WS_2$ nanospheres were found to be polyhedral instead of perfect circles having a diameter in the range of about 10 nm to about 30 nm.

Particle size distribution of $WS_2$ nanospheres revealed that most of the nanospheres had diameter in the range of about 5 nm to about 27 nm with very few particles having a diameter in the range of about 100 nm to about 271 nm.

Figure 6:
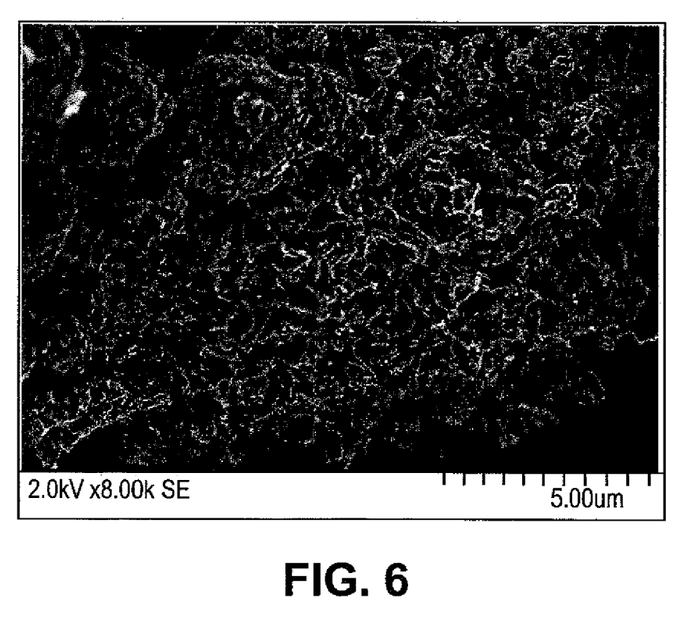
FIG. 6 depicts an SEM image of exemplary WS$_2$ nanotubes in accordance with the present teachings.
Figure 7:
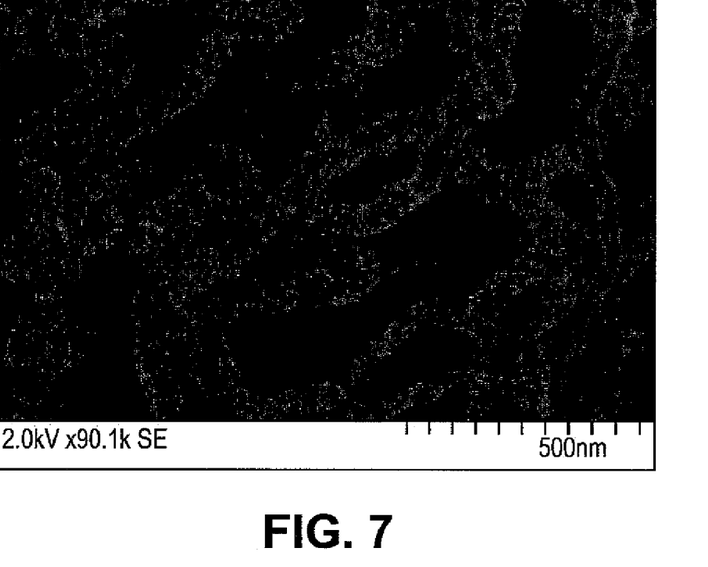
FIG. 7 depicts a higher magnification SEM image of exemplary WS$_2$ nanotubes shown in FIG. 6 in accordance with the present teachings.

$WS_2$ nanotubes of Table 1 were often found near nanospheres as shown in FIG. 6. FIG. 7 shows a higher resolution SEM image of $WS_2$ nanotubes shown in FIG. 6 and one can clearly observe kinks in many of the nanotubes. The $WS_2$ nanotubes were formed with multiple walls with an outer diameter of about 50 nm and a length of about slightly less than one micron to several microns. The average $WS_2$ nanotubes diameter was about 59.5 nm, with the minimum diameter of about 28 nm, and the maximum diameter of about 104.6 nm. The majority of the $WS_2$ nanotubes had a diameter between about 44 and about 80 nm.

Example 6

Preparation of $WS_2$ Nanotubes-Epoxy Composite

About 3 weight % $WS_2$ nanotubes-epoxy composite ($WS_2$ nanocomposite) sample was formed by adding $WS_2$ nanotubes to aeropoxy PR2032 resin (PTM&W Industries, Inc., Santa Fe Springs, Calif.) and PH3660 hardener (PTM&W Industries, Inc., Santa Fe Springs, Calif.) with mix ratio of about 3:1:: Resin:Hardener by volume.

$WS_2$ nanotubes were added to ethanol in the 1:10 ratio by weight and the solution was sonicated with an ultrasonic cleaner (Sharpertek® Stamina XPP™, SHARPERTEK USA, Auburn Hills, Mich.) at 40 kHz and 700 Watts for an hour. The sonicated suspension was then added to the hardener and sonicated for one more hour. The suspension was then vacuumed until the alcohol content was evaporated. The WS2 nanotubes/hardener suspension was then added to the resin. Further mixing and dispersion of nanotubes was performed using a mechanical stirrer and a sonicator simultaneously for few minutes. The short gelling time of the epoxy was a limiting factor for longer dispersing of the nanotubes. Therefore, the sample was degassed right after the resin was added to prevent any trapping of air bubbles in the nanocomposite. The sample was left to cure for 24 hours at room temperature.

For comparison, about 3 weight % single walled carbon nanotubes (SWNT)—epoxy composite (SWNT nanocomposite) was also formed using procedure as described above for $WS_2$ nanotubes-epoxy composite.

Example 7

Mechanical Properties of $WS_2$ Nanotubes-Epoxy Composite ($WS_2$ Nanocomposite)

The mechanical testing was done in the same sequence as the samples were made to avoid any aging effects. A nanoindenter, Nano Test 600 (Micro Materials Limited, Wrexham, UK) was used to test the mechanical properties of the samples prepared in Example 6.

Figure 8:
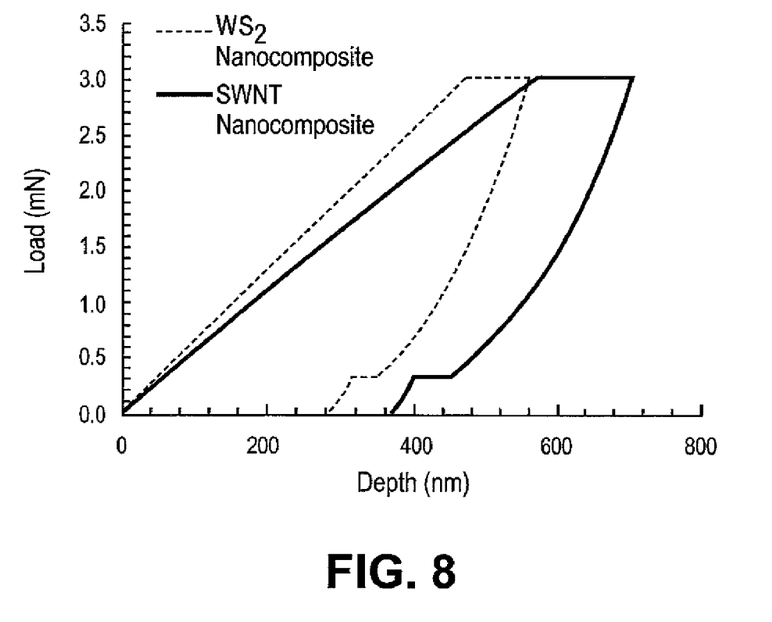
FIG. 8 shows loading/unloading hysteresis of an exemplary WS$_2$ nanocomposite in comparison to a SWNT nanocomposite in accordance with the present teachings.

Nanoindentation tests were performed using about 5 micron radius spherical diamond tip. A total of 10 load-controlled to about 3 mN maximum load indentations were carried out on different spots on each nanocomposite sample. The initial load and loading/unloading rate were set to about 0.03 mN and about 0.1 mN/sec respectively. A holding period of about 60 seconds at the peak load was used and the data were corrected for thermal drift. FIG. 8 shows exemplary nanoindentation curves for the two composites samples of Example 6. Oliver-Phar analysis was used to extract the reduced modulus and hardness and the averaged results for 10 tests for each sample are summarized in Table 2.

TABLE 2

|  | $WS_2$ nanocomposite | SWNT nanocomposite |
|---|---|---|
| Hardness (GPa) | 0.19006 ± 0.01363 | 0.17388 ± 0.00240 |
| Reduced Modulus (GPa) | 4.438 ± 0.234 | 3.487 ± 0.054 |

These results reveals that the hardness and reduced modulus of the $WS_2$ nanocomposite is about 10% and about 27% respectively better than the corresponding values for SWNT nanocomposite.

The nano impulse module of the Nano Test 600 allows for repetitive impacts of energized diamond probe into the material surface. The indenter tip was accelerated in less than about a second from a distance of about 12.5 microns to the surface of the samples of Example 6 to produce a load of about 3 mN. The repetitive impact was performed about 45 times in each spot with the diamond probe being about 2 seconds in contact and about 2 seconds off the surface. A total of 5 nano-impulse tests were carried out on each sample. Volume change between the first and last strikes was measured and used as a qualitative approach for comparing energy absorption of different samples. Impact resistance is then measured as the ability of the material to undergo less plastic deformation (smaller volume change) due to repetitive impact. The results of the nano impulse impact tests are summarized in Table 3

TABLE 3

|  | $WS_2$ nanocomposite | SWNT nanocomposite |
|---|---|---|
| Crate volume change ($nm^3$) | $1.21 \times 10^{11} \pm 0.15 \times 10^{11}$ | $1.69 \times 10^{11} \pm 0.12 \times 10^{11}$ |

Table 3 shows that the volume change of $WS_2$ nanotube based composite was about 70% that of the SWNT based composite. Hence, the impact resistance of $WS_2$ nanotube based composite was about 28% better than that of the SWNT based composite.

Hence, the $WS_2$ nanocomposite formed in accordance with the present teachings exhibited superior mechanical properties over SWNT nanocomposite.

$WS_2$ nanostructures and $WS_2$ nanostructure composites can be used for a wide variety of applications, including, but not limited to, dry lubricants, low friction coating, engine oil additive, bulletproof ware, scanning electron microscope probe tips, hydrogen fuel cell storage, and lithium storage battery technology.

Other embodiment of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A method for synthesizing a nanostructured material comprising:
   providing a plurality of precursor materials, wherein each of the plurality of precursor materials comprises a tungsten reactant; and
   flowing, for a reaction time, a substantially continuous stream of carbon disulfide ($CS_2$) vapor in a carrier gas over the plurality of precursor materials at a temperature in the range of about 700° C. to about 1000° C., wherein the reaction time is sufficient to permit the tungsten reactant to react with carbon disulfide to form a plurality of tungsten disulfide ($WS_2$) nanostructures.

2. The method of claim 1, wherein the step of providing a plurality of precursor materials comprises providing a plurality of precursor materials as liquid dispersions, solids, or aerosols.

3. The method of claim 1, wherein the step of flowing, for a reaction time, a substantially continuous stream of carbon disulfide ($CS_2$) vapor in a carrier gas over the plurality of precursor materials at a temperature in the range of about 700° C. to about 1000° C. comprises flowing, for a reaction time, a substantially continuous stream of carbon disulfide ($CS_2$) vapor in a carrier gas mixed with the plurality of precursor materials at a temperature in the range of about 700° C. to about 1000° C.

4. The method of claim 1, wherein the plurality of $WS_2$ nanostructures comprise one or more nano structural forms selected from the group consisting of flakes, particles, fibers, tubes, rods, spheres (inorganic fullerene), and octahedral crystals.

5. The method of claim 1, wherein the plurality of $WS_2$ nanostructures comprise inorganic fullerenc like IF-$WS_2$ spherical nanoparticles.

6. The method of claim 1, wherein the step of providing a plurality of precursor materials comprises providing precursor materials having at least one dimension in the range of about 10 nm to about 20 μm.

7. The method of claim 1, wherein the tungsten reactant is selected from the group consisting of tungsten oxides and tungsten salts.

8. The method of claim 1, wherein the carrier gas comprises one or more of argon and nitrogen.

9. The method of claim 6, wherein the carrier gas further comprises hydrogen.

10. The method of claim 1, wherein the reaction time is at least about 20 minutes.

11. $WS_2$ nanostructures formed using the method according to claim 1.

12. The method of claim 1 further comprising adding the plurality of tungsten disulfide ($WS_2$) nanostructures to one or more of metals, ceramics, and polymers to form a nanostructured composite material.

13. A nanostructured composite material comprising:
   a major amount of one or more materials selected from the group consisting of metals, ceramics, and polymers; and
   a minor amount of $WS_2$ nanostructures formed using the method according to claim 1.

14. A method for synthesizing a nanostructured material comprising:
   providing a plurality of precursor materials, wherein each of the plurality of precursor materials comprises a tungsten reactant; and
   flowing, in a plasma system, a substantially continuous stream of carbon disulfide ($CS_2$) vapor in a carrier gas over the plurality of precursor materials for a reaction time, wherein the reaction time is sufficient to permit the tungsten reactant to react with carbon disulfide to form a plurality of tungsten disulfide ($WS_2$) nanostructures.

15. The method of claim 14, wherein the plasma system is selected from the group consisting of microwave plasma, RF plasma, and DC plasma.

16. The method of claim 14, wherein the plasma system uses a pressure in the near atmospheric range.

17. The method of claim 14 further comprising using the carrier gas comprising one or more of argon and nitrogen, to create a plasma.

18. The method of claim 14, wherein the tungsten reactant is selected from the group consisting of tungsten oxides and tungsten salts.

19. The method of claim 14, wherein the plurality of tungsten disulfide ($WS_2$) nanostructures comprises inorganic fullerene like IF—$WS_2$ spherical nanoparticles or nanotubes.

20. $WS_2$ nanostructures formed using the method according to claim 14.

21. The method of claim 14 further comprising adding the plurality of tungsten disulfide ($WS_2$) nanostructures to one or more of metals, ceramics, and polymers to form a nanostructured composite material.

22. A nanostructured composite material comprising:
   a major amount of one or more materials selected from the group consisting of metals, ceramics, and polymers; and
   a minor amount of $WS_2$ nanostructures formed using the method according to claim 14.

* * * * *